US010860984B1

United States Patent
Ramesh et al.

(10) Patent No.: US 10,860,984 B1
(45) Date of Patent: Dec. 8, 2020

(54) OUT OF OFFICE EMAIL DETECTION SYSTEM

(71) Applicant: Microsoft Technology Licensing, LLC, Redmond, WA (US)

(72) Inventors: Ramanan Vellore Ramesh, Redmond, WA (US); Xiaodong Wang, Suzhou (CN); Chung Heong Gooi, Redmond, WA (US); Joao Cangussu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 6 days.

(21) Appl. No.: 16/444,213

(22) Filed: Jun. 18, 2019

(51) Int. Cl.
G06F 15/16 (2006.01)
G06Q 10/10 (2012.01)
H04L 12/58 (2006.01)

(52) U.S. Cl.
CPC ....... G06Q 10/107 (2013.01); G06Q 10/1093 (2013.01); H04L 51/14 (2013.01)

(58) Field of Classification Search
CPC ............... H04L 65/601; H04L 65/4084; H04L 65/4092; H04L 65/602; H04L 65/608; H04L 67/02; H04L 67/42; H04N 21/2343; H04N 21/234327; H04N 21/23439; H04N 21/2358; H04N 21/25808; H04N 21/25825; H04N 21/25833; H04N 21/25858; H04N 21/8456
USPC ...................................................... 709/219
See application file for complete search history.

(56) References Cited

U.S. PATENT DOCUMENTS

| 6,678,719 | B1* | 1/2004 | Stimmel | G06Q 10/107 709/204 |
| 7,305,437 | B2* | 12/2007 | Horvitz | G06Q 10/109 706/21 |
| 7,386,595 | B1* | 6/2008 | Bloomer, Jr. | G06Q 10/107 709/203 |
| 7,457,879 | B2* | 11/2008 | Horvitz | G06Q 10/107 706/46 |
| 7,474,741 | B2* | 1/2009 | Brunson | H04L 29/06027 379/88.12 |
| 7,475,116 | B2 | 1/2009 | Hay | |

(Continued)

OTHER PUBLICATIONS

Ye Wang and H. Abdel-Wahab, "A Multilayer Approach of Anomaly Detection for Email Systems," 11th IEEE Symposium on Computers and Communications (ISCC'06), Cagliari, Italy, 2006, pp. 48-53, doi: 10.1109/ISCC.2006.10. (Year: 2006).*

(Continued)

*Primary Examiner* — Melvin H Pollack
(74) *Attorney, Agent, or Firm* — Schwegman Lundberg & Woessner, P.A.

(57) ABSTRACT

A system and method for determining an out of office status is described. A server accesses email data for a user account and determines email activities from the email data. The email activities comprises a rate of number of read emails and sent emails from the user account over a first time frame. The system determines weekday email activities and weekend email activities from the email activities over the first time frame. The system compares weekday email activities of a second time frame with the weekend email activities of the first time frame. The system assigns an out of office label to one or more weekday of the second time frame in the calendar application for the user account based on the comparing.

20 Claims, 8 Drawing Sheets

(56) References Cited

U.S. PATENT DOCUMENTS

| | | | |
|---|---|---|---|
| 7,493,369 B2* | 2/2009 | Horvitz | G06Q 10/109 |
| | | | 706/10 |
| 7,558,825 B2* | 7/2009 | Bodin | H04L 29/06 |
| | | | 709/206 |
| 7,974,849 B1* | 7/2011 | Begole | G06Q 10/10 |
| | | | 705/1.1 |
| 7,984,105 B2* | 7/2011 | Griffin | H04L 51/043 |
| | | | 709/206 |
| 8,751,582 B1* | 6/2014 | Behforooz | H04L 67/24 |
| | | | 709/206 |
| 8,862,519 B2 | 10/2014 | O'Sullivan et al. | |
| 8,949,177 B2* | 2/2015 | Chen | H04M 3/2218 |
| | | | 707/609 |
| 9,043,462 B2* | 5/2015 | Badiee | H04L 67/22 |
| | | | 709/224 |
| 9,064,244 B2* | 6/2015 | Brauninger | H04L 51/02 |
| 9,105,000 B1* | 8/2015 | White | G06F 16/244 |
| 9,183,497 B2* | 11/2015 | Zhang | G06Q 30/0255 |
| 9,197,590 B2* | 11/2015 | Beausoleil | H04L 51/34 |
| 9,288,298 B2* | 3/2016 | Choudhary | A61B 5/0022 |
| 9,408,143 B2 | 8/2016 | Walker et al. | |
| 9,682,281 B2* | 6/2017 | Mestas | G16H 20/30 |
| 10,051,600 B1* | 8/2018 | Zhong | G06F 16/951 |
| 10,284,513 B2* | 5/2019 | Bastide | H04L 67/10 |
| 10,348,658 B2* | 7/2019 | Rodriguez | H04L 65/1093 |
| 10,367,767 B2* | 7/2019 | Jayaram | H04L 51/16 |
| 10,404,636 B2* | 9/2019 | Rodriguez | H04L 65/60 |
| 10,417,613 B1* | 9/2019 | Brisebois | G06Q 10/1095 |
| 10,505,882 B2* | 12/2019 | Hempton | H04L 51/22 |
| 10,567,568 B2* | 2/2020 | Dotan-Cohen | H04L 67/306 |
| 10,681,060 B2* | 6/2020 | Scheidler | G06F 21/554 |
| 10,681,209 B2* | 6/2020 | Hassan | H04M 1/72569 |
| 2002/0187794 A1* | 12/2002 | Fostick | H04M 3/5322 |
| | | | 455/466 |
| 2004/0039630 A1 | 2/2004 | Begole et al. | |
| 2008/0104177 A1* | 5/2008 | Keohane | G06Q 10/107 |
| | | | 709/206 |
| 2009/0019182 A1 | 1/2009 | Riise et al. | |
| 2009/0083272 A1 | 3/2009 | Li et al. | |
| 2009/0112997 A1* | 4/2009 | Parker, II | H04L 67/02 |
| | | | 709/206 |
| 2013/0097270 A1* | 4/2013 | Plotkin | H04L 51/02 |
| | | | 709/206 |
| 2015/0195224 A1* | 7/2015 | Karnin | G06N 20/00 |
| | | | 706/12 |
| 2015/0332200 A1 | 11/2015 | Bernaudin et al. | |
| 2015/0381533 A1* | 12/2015 | Klemm | H04L 51/02 |
| | | | 709/206 |
| 2016/0057082 A1 | 2/2016 | Bhide et al. | |
| 2016/0086116 A1* | 3/2016 | Rao | G06F 3/0481 |
| | | | 705/7.21 |
| 2017/0004433 A1* | 1/2017 | Raghavan | H04L 41/5006 |
| 2017/0140285 A1* | 5/2017 | Dotan-Cohen | G06Q 10/04 |
| 2018/0006989 A1* | 1/2018 | Dotan-Cohen | H04L 67/22 |
| 2018/0139292 A1* | 5/2018 | Koren | H04L 51/043 |
| 2018/0211175 A1* | 7/2018 | Mendels | G06N 5/048 |
| 2019/0205839 A1* | 7/2019 | Dotan-Cohen | G06Q 10/1093 |
| 2019/0297046 A1* | 9/2019 | Greenspan | H04L 51/22 |
| 2020/0097303 A1* | 3/2020 | O'Kane | G06Q 10/109 |
| 2020/0107152 A1* | 4/2020 | Dotan-Cohen | G06Q 10/10 |

OTHER PUBLICATIONS

M. Muhlenbrock, O. Brdiczka, D. Snowdon and J. -. Meunier, "Learning to detect user activity and availability from a variety of sensor data," Second IEEE Annual Conference on Pervasive Computing and Communications, 2004. Proceedings of the, Orlando, FL, USA, 2004, pp. 13-22 (Year: 2004).*

C. Schafer, "Detection of compromised email accounts used for spamming in correlation with mail user agent access activities extracted from metadata," 2015 IEEE Symposium on Computational Intelligence for Security and Defense Applications (CISDA), Verona, NY, 2015, pp. 1-6 (Year: 2015).*

"Office 365 Reports in the Admin Center—Email activity",Retrieved From: https://docs.microsoft.com/en-us/office365/admin/activity-reports/email-activity?view=0365-worldwide , 4 Pages.

"Non Provisional Application as Filed in U.S. Appl. No. 15/994,135", filed May 31, 2018, 55 Pages.

* cited by examiner

OUT OF OFFICE EMAIL DETECTION SYSTEM

BACKGROUND

The subject matter disclosed herein generally relates to a special-purpose machine that improves an operation of an email application, including computerized variants of such special-purpose machines and improvements to such variants. Specifically, the present disclosure addresses systems and methods for a tool that monitors usage of an email application.

A user of an email application can modify settings in the email application to set an "out of office" (OOO) automatic reply. The OOO automatic reply feature generates an automatic reply to emails received during a time frame specified by the user. The automatic reply may indicate that the user is not available and is out of the office for a specific period of time. However, a user of the email application may forget to enable the OOO automatic reply feature before leaving their office. This can result in frustrating situations such as when a co-worker is attempting to reach the user of the email application. In other situations, the user of the email application may forget to disable the OOO automatic reply feature after the specified period of time has elapsed. This can cause confusion to other co-workers as to whether the user is really back at their office.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present application describes a system for detecting whether a user of an email application is out of the office or not available based on an analysis of email activities of the user. In one example embodiment, the system enables an out of office (OOO) automatic reply when the system detects that the user is out of the office. In another example embodiment, the system disables the out of office (OOO) automatic reply when the system detects that the user is no longer out of the office. In yet another example embodiment, the system modifies a content of the OOO automatic reply based on the analysis of the email activities of the user. For example, the content of the OOO automatic reply indicates a dynamic date range of OOO reply. The dynamic data range changes based on whether the system detects that the user is back at the office.

In one example embodiment, the system performs an analysis based on the assumption that the email behavior of a user on vacation is likely the same as the email behavior of the user over the weekend. Using this assumption as a premise, the system computes the email activity (e.g., inbound emails and outbound emails) for the user. In another example embodiment, the system determines email activities (e.g., weighted time for emails sent and email read) from an email application. The system aggregates the email activities for each day and creates data clusters based off the email activity hours. The system then determines the cluster that has the maximum number of weekend data points. Within this cluster, the system identifies the days which are weekdays and checks if the activity hours are less than a particular threshold. For all the workdays within the weekend cluster, the system tags them OOO or vacation day.

In one example embodiment, the present application describes a system and method for determining an out of office status for an email application is described. A server accesses email data for a user account and determines email activities from the email data. The email activities comprise a rate of number of read emails and sent emails from the user account over a first time frame. The system determines weekday email activities and weekend email activities from the email activities over the first time frame. The system compares weekday email activities of a second time frame with the weekend email activities of the first time frame. The system assigns an out of office label to one or more weekday of the second time frame in the calendar application for the user account based on the comparing.

As a result, one or more of the methodologies described herein facilitate solving the technical problem of identifying out of office states without explicit input or instructions from the user. As such, one or more of the methodologies described herein may obviate a need for certain efforts or computing resources. Examples of such computing resources include processor cycles, network traffic, memory usage, data storage capacity, power consumption, network bandwidth, and cooling capacity.

Figure 1:
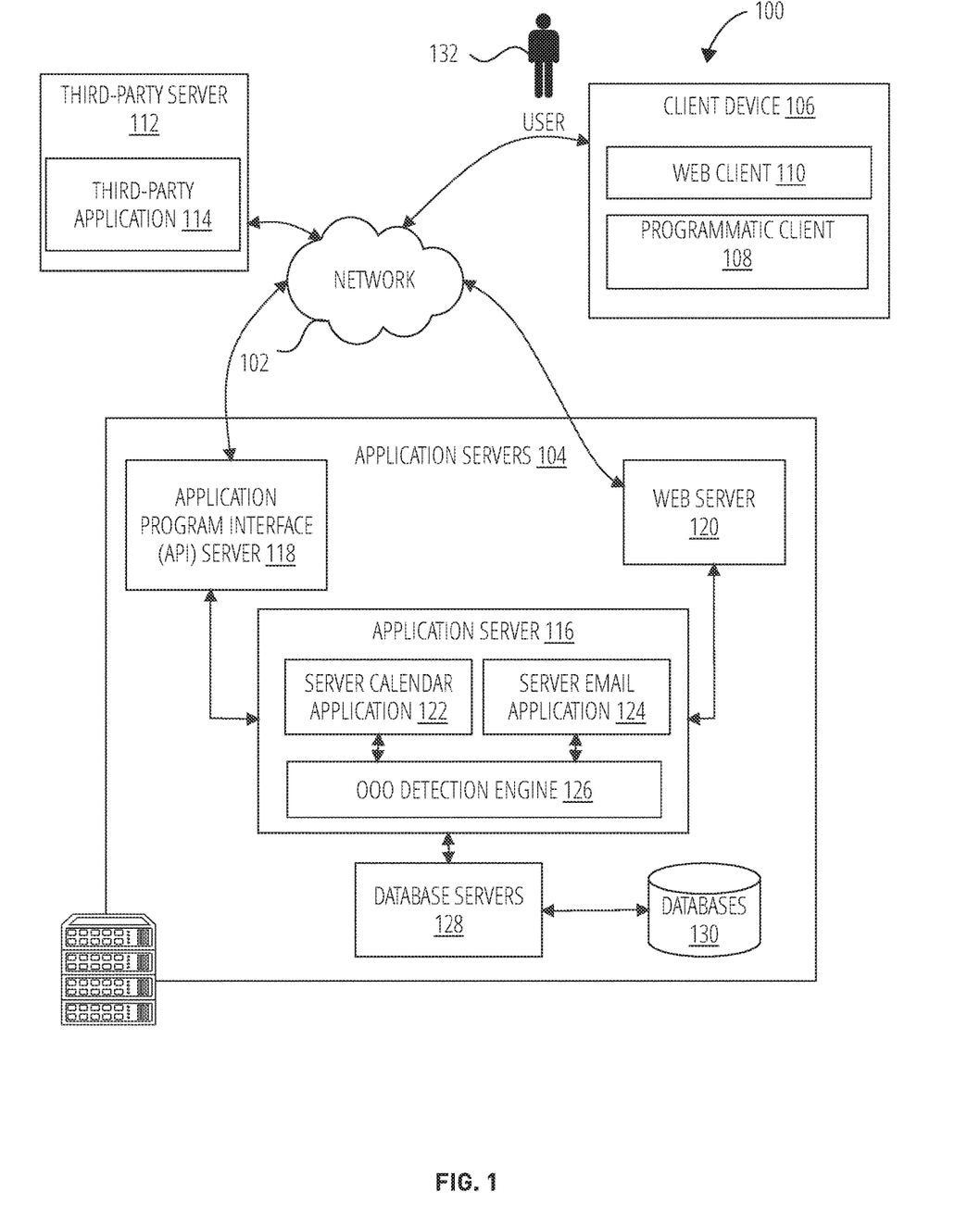
FIG. 1 is a diagrammatic representation of a networked environment in which the present disclosure may be deployed, in accordance with some example embodiments.

FIG. 1 is a diagrammatic representation of a network environment in which some example embodiments of the present disclosure may be implemented or deployed. One or more application servers 104 provide server-side functionality via a network 102 to a networked user device, in the form of a client device 106. A user 132 operates the client device 106. The client device 106 includes a web client 110 (e.g., a browser), a programmatic client 108 (e.g., an email/calendar application such as Microsoft Outlook™) that is hosted and executed on the client device 106.

An Application Program Interface (API) server 118 and a web server 120 provide respective programmatic and web interfaces to application servers 104. A specific application server 116 hosts a server calendar application 122, a server email application 124, and an OOO detection engine 126. The server calendar application 122, the server email application 124, and the OOO detection engine 126 include components, modules and/or applications.

The server calendar application 122 stores and updates calendar data associated with a user account of the user 132. The server email application 124 stores and updates email data associated with the user account of the user 132.

In one example embodiment, the OOO detection engine 126 communicates with the server email application 124 to detects whether a user is unavailable (e.g., out of the office or on vacation) based on email activities from the user 132. The OOO detection engine 126 enables an OOO automated reply when it detects that the user if not available based on an analysis of the email activities of the user 132. In another example, the OOO detection engine 126 disables the OOO automated reply when it detects that the user is now available based on an analysis of the email activities of the user 132.

The server email application 124 communicates with the client device 106 supported by the web server 120 to provide the email data to the programmatic client 108. In one example, the web client 110 communicate with the OOO detection engine 126, server calendar application 122, and server email application 124 via the programmatic interface provided by the Application Program Interface (API) server 118.

The third-party application 114 may, for example, be another cloud storage system. The application server 116 is shown to be communicatively coupled to database servers 128 that facilitates access to an information storage repository or databases 130. In an example embodiment, the databases 130 includes storage devices that store information to be published and/or processed by at least one of the server calendar application 122, the server email application 124, and the OOO detection engine 126.

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party.

Figure 2:
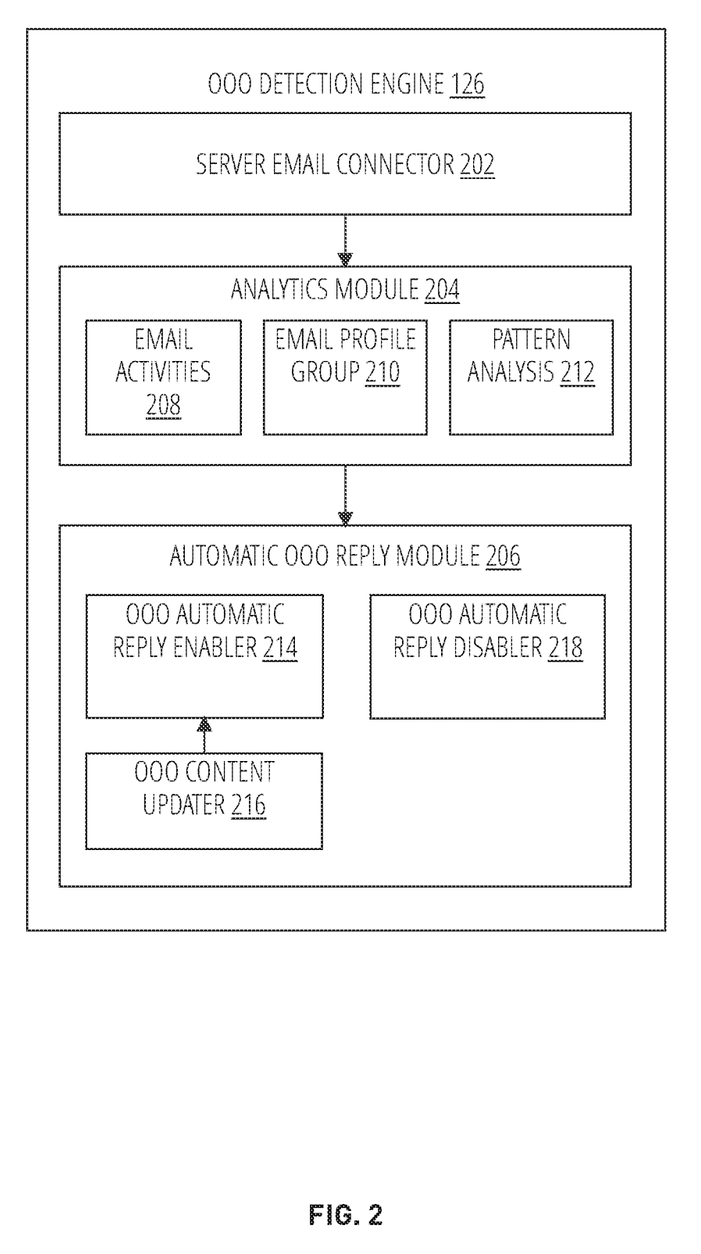
FIG. 2 is a block diagram illustrating an out of office detection engine in accordance with one example embodiment.

FIG. 2 is a block diagram illustrating an out of office detection engine in accordance with one example embodiment. The OOO detection engine 126 includes a server email connector 202, an analytics module 204, and an automatic OOO reply module 206.

The server email connector 202 communicates with the server email application 124 to access and update email data associated with the user account of the user 132. For example, the server email connector 202 retrieves emails from the server email application 124, determines which emails have been read by the user 132 and which emails have been sent by the user 132.

The analytics module 204 analyzes the email data and determine whether the user is not available to reply to emails (e.g., out of office, on vacation, on sick leave). In one example embodiment, the analytics module 204 includes email activities 208, an email profile group 210, and a pattern analysis 212. The email activities 208 include, for example, a rate of number of read emails and sent emails from the user account of the user 132 over a first time frame (e.g. several weeks last year), In one example embodiment, the email activities 208 include the number of read and sent emails is weighted based on the time an email was sent or read (e.g., between 9 am and 5 pm, assign a weight of 2 for each email read or sent, between 5 pm and 9 am, assign a weight of 1 for each email read or sent). The email activities 208 aggregates the number of emails read or sent per hour for each day of the first time frame.

The email profile group 210 determines the group to which the user 132 belong based on the email activities 208. In one example embodiment, the email profile group 210 includes three groups: a low email activity group, a normal email activity group, a high email activity group. The low email activity group includes users with one or less email per hour in a week. The high email activity group includes users with a number of email activities regardless of weekend and weekdays. For example, the user 132 may belong to this group if the user 132 emails 6 times/hour on a weekday and 5 times/hour on a weekend.

The pattern analysis 212 determines email patterns for email activities during weekdays and email activities during weekends. In one example embodiment, the pattern analysis 212 creates data clusters based off email activity hours. The pattern analysis 212 determines the cluster which has the maximum number of weekend data points. Within this cluster, the pattern analysis 212 identifies the days which are weekdays and checks if the activity hours are less than a particular threshold. For all the workdays within the weekend cluster, the pattern analysis 212 tags them (e.g., the weekdays with activity hours are less than the particular threshold) an OOO label. The pattern analysis 212 may exclude the analysis for a weekday that falls on a holiday.

In another example embodiment, the pattern analysis 212 does not perform the analysis on emails activities corresponding to the low email activity group or the high email activity-group. The pattern analysis 212 performs the analysis on the normal email activity group. In one example, the pattern analysis 212 filters a set of users by calculating Mean and Standard deviation for weekdays and weekends separately. If the weekday average is less than weekend average plus thrice the standard deviation, users are disqualified from the following analysis.

In one example embodiment, for users that belong to the normal email activity group, the pattern analysis 212 utilizes K+±Means Clustering Algorithm to detect an OOO state. The pattern analysis 212 aggregate the everyday email activities per user. There will be a multiplexing if both activities occur in the same time window. For example, a window may be defined with a 5 minute boundary. For each individual user, the pattern analysis 212 run a K++Means clustering algorithm that uses Euclidean Distance to find the distance between centroids with various K values. Using Elbow Method, the pattern analysis 212 finds that the optimum number of clusters is 3. This divides the activities into three clusters: (1) weekend clusters, (2) weekday clusters, and (3) probably weekend or weekday cluster. The weekend clusters include clusters with most of weekend related activities. The weekday clusters include clusters with most of weekday related activities. The probable weekday/weekend clusters include clusters with probably a weekday or a weekend related activities.

Within the weekend clusters, the pattern analysis 212 identifies the days which are normal working days. For each of these days, the pattern analysis 212 checks if the activity is within thrice the standard deviation of all the weekend activities. If yes, the pattern analysis 212 labels these days as OOO state.

The automatic OOO reply module 206 generates an automated email based on the pattern analysis 212. In one example embodiment, the automatic OOO reply module 206 includes an OOO automatic reply enabler 214, an OOO automatic reply disabler 218, and an OOO content updater 216. The OOO automatic reply enabler 214 turns on the automatic OOO reply of the server email application 124. For example, when the pattern analysis 212 detects that the user 132 is currently OOO based on his email activities 208, the OOO automatic reply enabler 214 turns on the automatic OOO reply. The OOO automatic reply disabler 218 turns off the automatic OOO reply of the server email application 124. For example, when the pattern analysis 212 detects that the user 132 is not OOO anymore based on his email activities 208, the OOO automatic reply enabler 214 turns off the automatic OOO reply.

In another example embodiment, the OOO content updater 216 updates a content of the automatic OOO reply. For example, the OOO content updater 216 updates the dates of the OOO state of the user 132 based on the updated OOO states of the user 132 detected by the pattern analysis 212. For example, the dates in the automated reply may change from "January 1 to January 5" to "January to January 6", when the pattern analysis 212 performs an analysis on January 7 and detects that the user 132 is still OOO.

Figure 3:
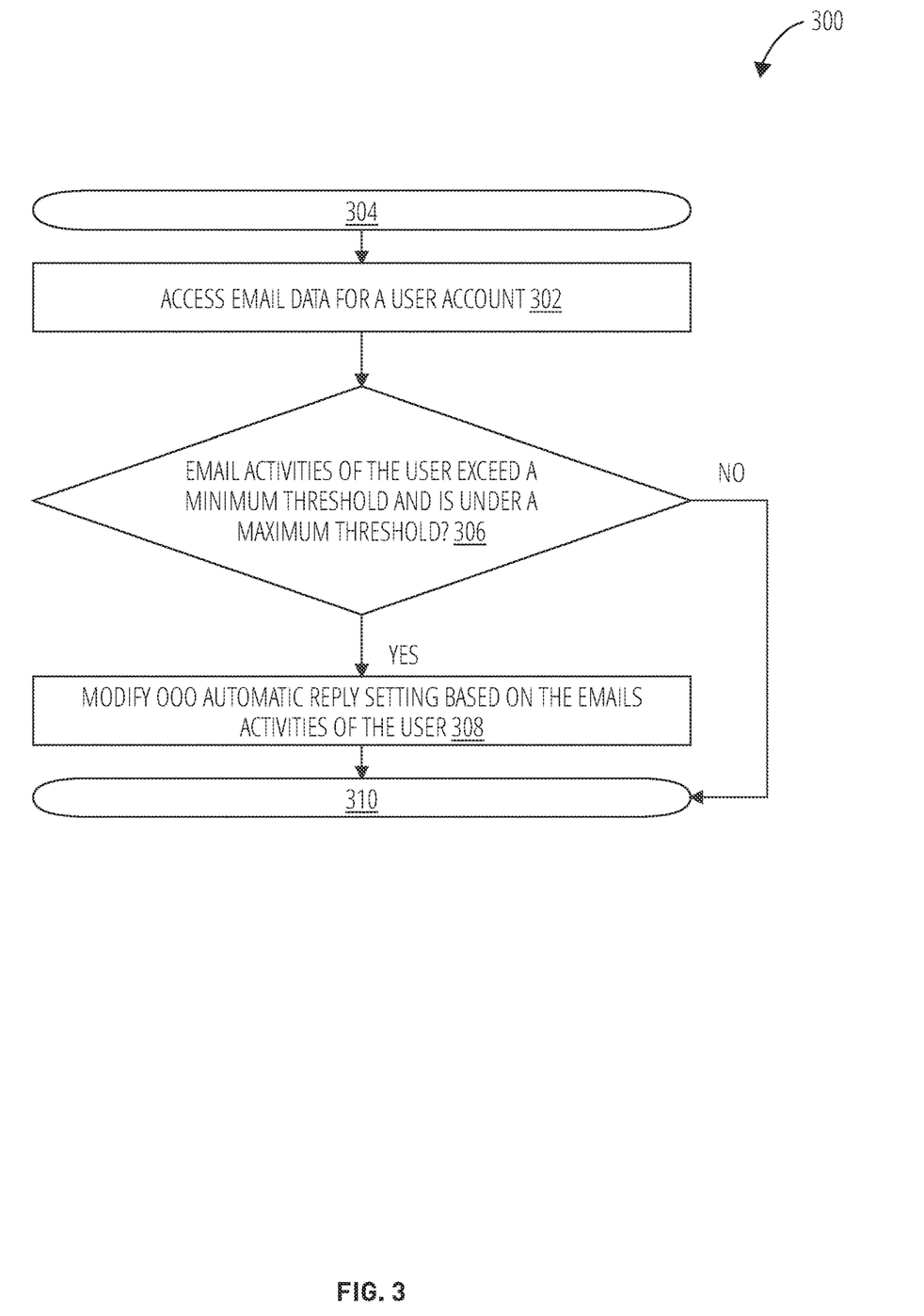
FIG. 3 is a flow diagram illustrating a method for modifying an out of office automatic reply setting in accordance with one example embodiment.

FIG. 3 is a flow diagram illustrating a method for modifying an out of office automatic reply setting in accordance with one example embodiment. Operations in the method 300 may be performed by the OOO detection engine 126, using components (e.g., modules, engines) described above with respect to FIG. 2. Accordingly, the method 300 is described by way of example with reference to the OOO detection engine 126. However, it shall be appreciated that at least some of the operations of the method 300 may be deployed on various other hardware configurations or be performed by similar components residing elsewhere. For example, some of the operations may be performed at the programmatic client 108.

At block 302, the OOO detection engine 126 accesses email data for a user account (e.g., user account of user 132). At decision block 306, the OOO detection engine 126 determines whether the email activities of the user 132 exceed a minimum threshold (e.g., at least one email per hour per day and is under a maximum threshold at most 10 emails per hour per weekday and weekend). At block 308, the OOO detection engine 126 modifies the OOO automatic reply setting of the server email application 124 based on the email activities of the user 132.

Figure 4:
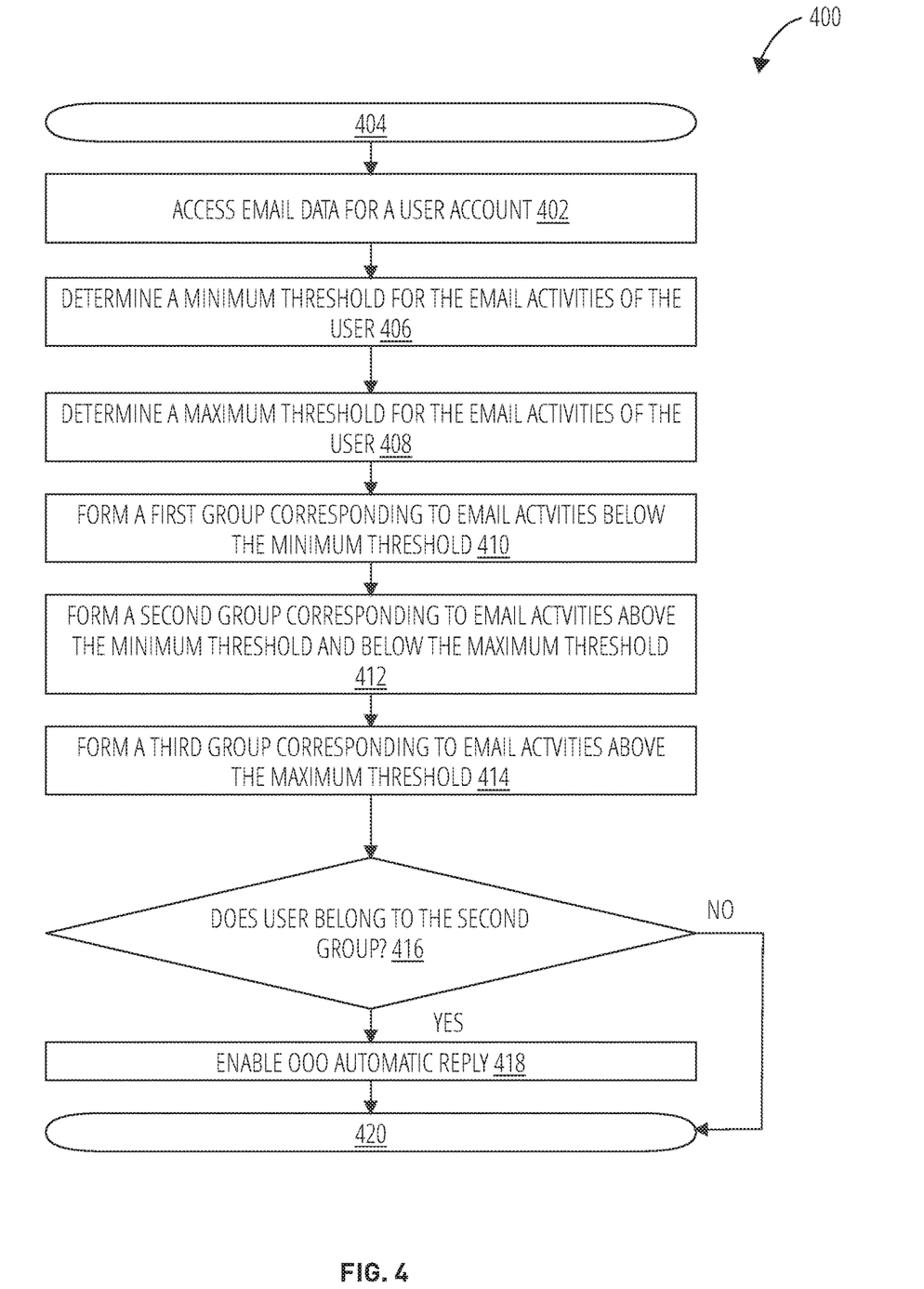
FIG. 4 is a flow diagram illustrating a method for analyzing email activities enabling an out of office automatic reply setting in accordance with one example embodiment.

FIG. 4 is a flow diagram illustrating a method 400 for generating an email identifying available time slots in accordance with one example embodiment. Operations in the method 400 may be performed by the OOO detection engine 126, using components (e.g., modules, engines) described above with respect to FIG. 2. Accordingly, the method 400 is described by way of example with reference to the OOO detection engine 126. However, it shall be appreciated that at least some of the operations of the method 400 may be deployed on various other hardware configurations or be performed by similar components residing elsewhere. For example, some of the operations may be performed at the programmatic client 108.

At block 402, the OOO detection engine 126 accesses email data for a user account of the user 132. At block 406, the OOO detection engine 126 determines a minimum threshold for the email activities of the user (e.g., minimum of one email activity per hour per day). At block 408, the OOO detection engine 126 determines a maximum threshold for the email activities of the user (e.g., maximum of 10 email activity per hour per weekday and weekend). At block 410, the OOO detection engine 126 forms a first group corresponding to email activities below to the minimum threshold (e.g., a low usage). At block 412, the OOO detection engine 126 forms a second group corresponding to email activities above the minimum threshold and below the maximum threshold (e.g., normal usage). At block 414, the OOO detection engine 126 forms a third group corresponding to email activities above the maximum threshold (e.g., high usage). At decision block 416, the OOO detection engine 126 determines whether the user 132 belongs to the second group. If yes, the OOO detection engine 126 enables the OOO automatic reply based on a further analysis of the email activities of the user 132.

Figure 5:
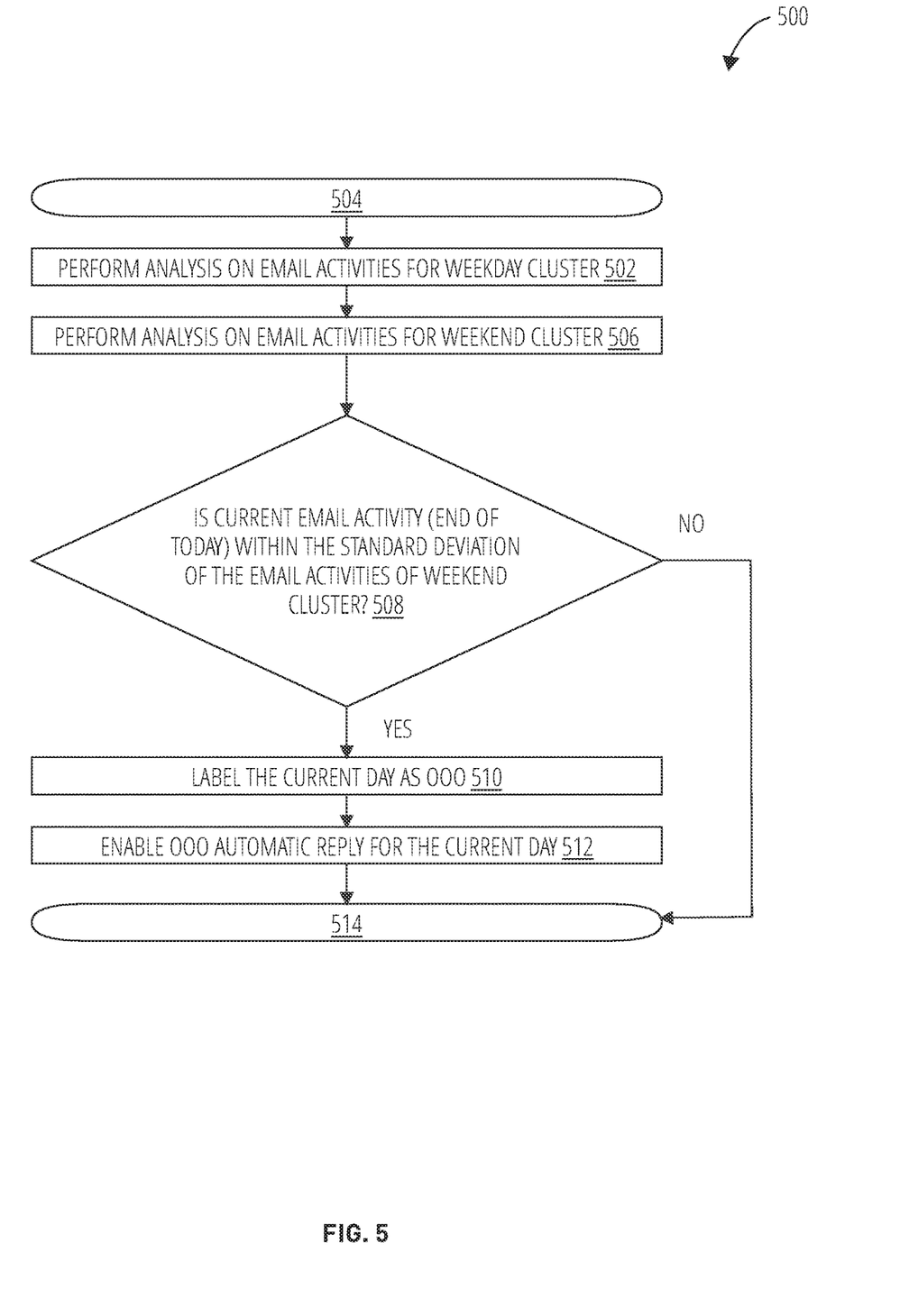
FIG. 5 is a flow diagram illustrating a method for analyzing email activities in accordance with one example embodiment.

FIG. 5 is a flow diagram illustrating a method 500 for generating an email identifying available time slots in accordance with one example embodiment. Operations in the method 500 may be performed by the OOO detection engine 126, using components (e.g., modules, engines) described above with respect to FIG. 2. Accordingly, the method 500 is described by way of example with reference to the OOO detection engine 126. However, it shall be appreciated that at least some of the operations of the method 500 may be deployed on various other hardware configurations or be performed by similar components residing elsewhere. For example, some of the operations may be performed at the programmatic client 108.

At block 502, the OOO detection engine 126 performs an analysis on email activities for weekday clusters. At block 506, the OOO detection engine 126 performs an analysis on email activities for weekend clusters. At decision block 508, the OOO detection engine 126 determines whether the current email activity (e.g., today's email activity) is within the standard deviation of the email activities of the weekend cluster. If yes, the OOO detection engine 126 labels the current day with an OOO state at block 510. At block 512, the OOO detection engine 126 enables the OOO automatic reply feature of the server email application 124 for the current day.

Figure 6:
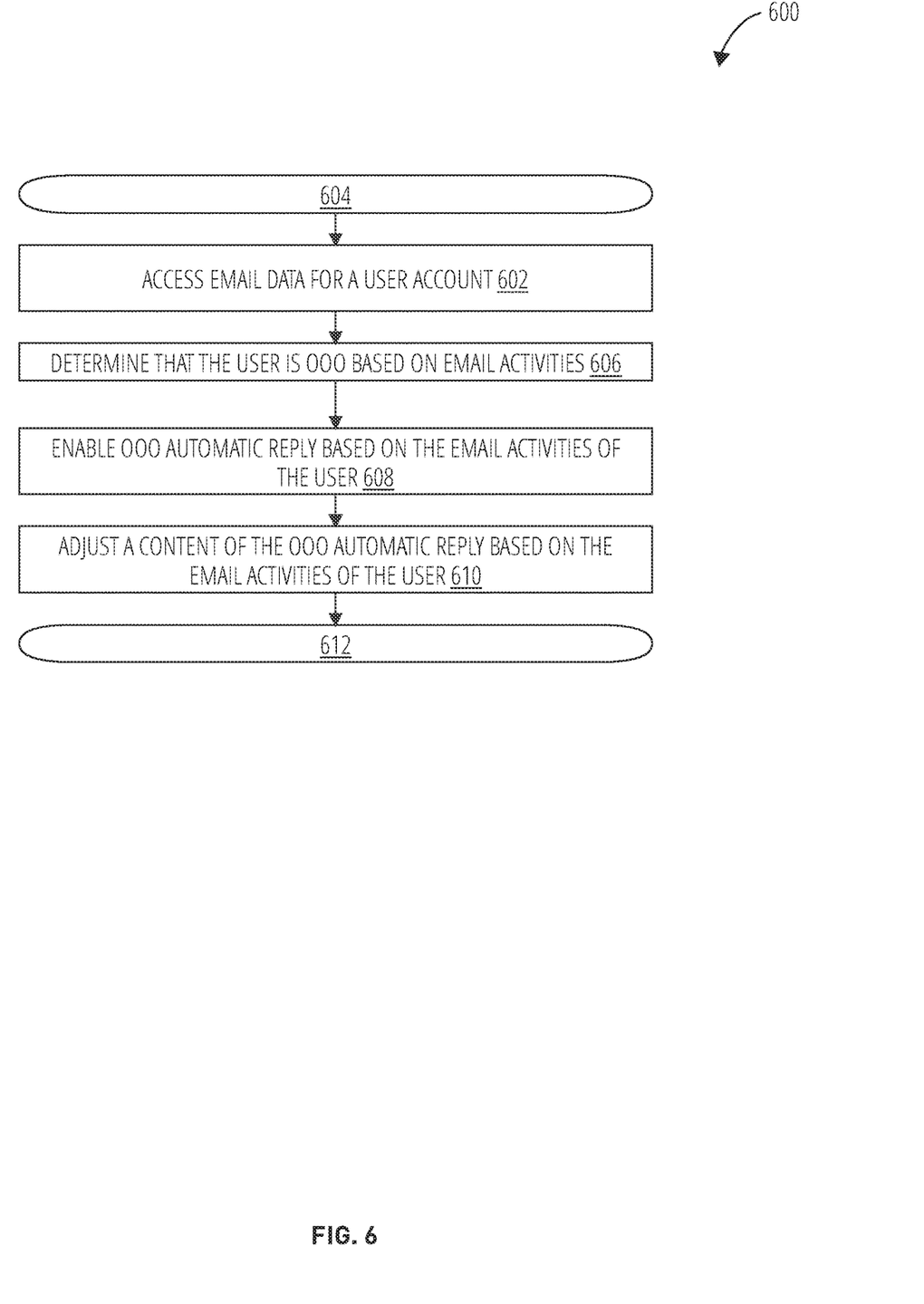
FIG. 6 is a flow diagram illustrating a method for adjusting a content of an t of office automatic reply in accordance with one example embodiment.

FIG. 6 is a flow diagram illustrating a method 600 for generating an email identifying available time slots in accordance with one example embodiment. Operations in the method 600 may be performed by the OOO detection engine 126, using components (e.g., modules, engines) described above with respect to FIG. 2. Accordingly, the method 600 is described by way of example with reference to the OOO detection engine 126. However, it shall be appreciated that at least some of the operations of the method 600 may be deployed on various other hardware configurations or be performed by similar components residing elsewhere. For example, some of the operations may be performed at the programmatic client 108.

At block 602, the OOO detection engine 126 accesses email data for a user account of the user 132. At block 606, the OOO detection engine 126 determines that the user is OOO based on email activities of the user 132. At block 608, the OOO detection engine 126 enables the OOO automatic reply based on the email activities of the user. At block 610, the OOO detection engine 126 adjusts a content of the OOO automatic reply based on the email activities of the user 132.

Figure 7:
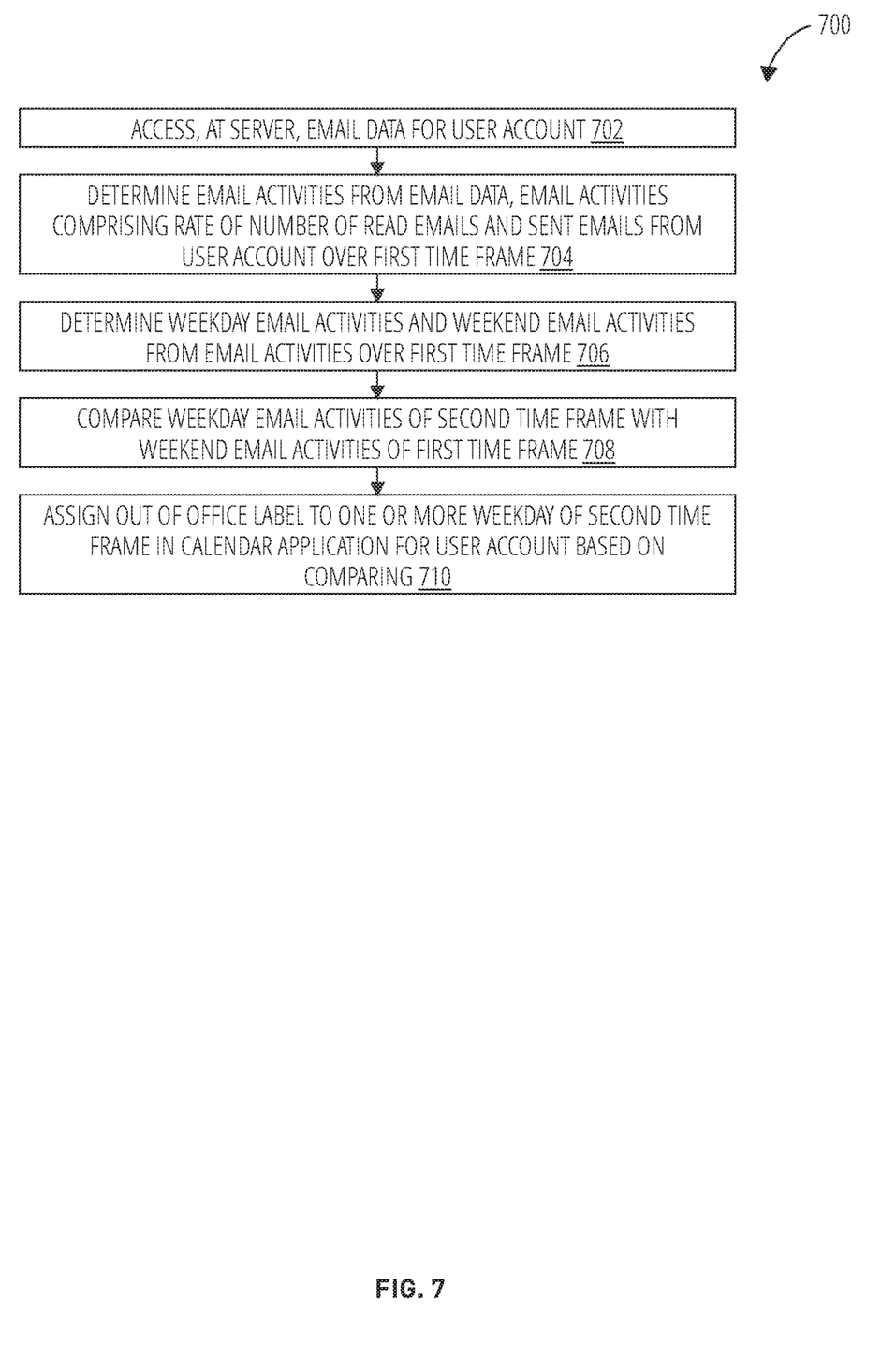
FIG. 7 illustrates a routine in accordance with one embodiment.

In block 702, routine 700 accesses, at a server, email data for a user account. In block 704, routine 700 determines email activities from the email data, the email activities comprising a rate of number of read emails and sent emails from the user account over a first time frame. In block 706, routine 700 determines weekday email activities and weekend email activities from the email activities over the first time frame. In block 708, routine 700 compares weekday email activities of a second time frame with the weekend email activities of the first time frame. In block 710, routine 700 assigns an out of office label to one or more weekday of the second time frame in the calendar application for the user account based on the comparing.

Figure 8:
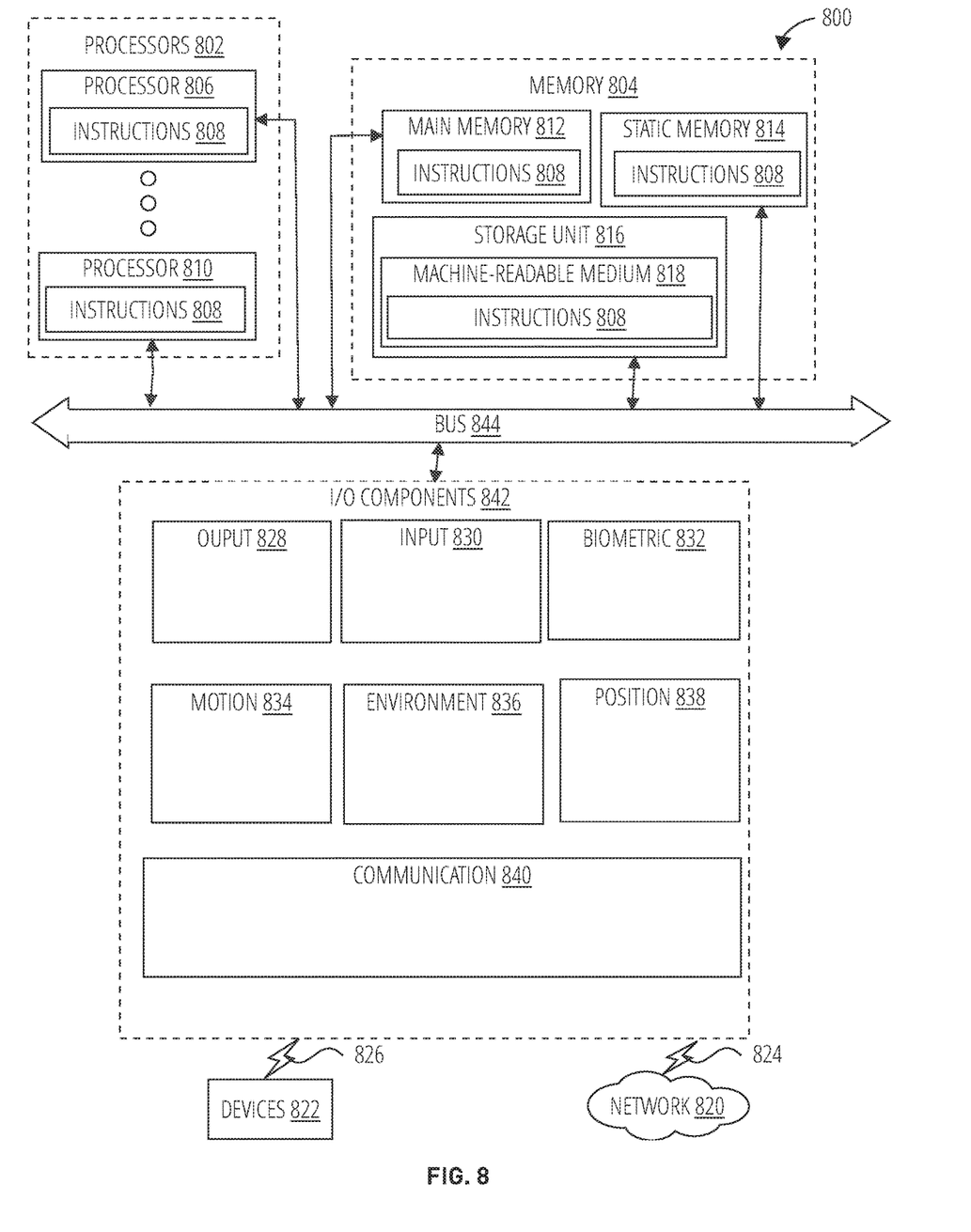
FIG. 8 is a diagrammatic representation of a machine in the form of a computer system within which a set of instructions may be executed for causing the machine to perform any one or more of the methodologies discussed herein, according to an example embodiment.

FIG. 8 is a diagrammatic representation of the machine 800 within which instructions 808 (e.g., software, a program, an application, an applet, an app, or other executable code) for causing the machine 800 to perform any one or more of the methodologies discussed herein may be executed. For example, the instructions 808 may cause the machine 800 to execute any one or more of the methods described herein. The instructions 808 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term "machine" shall also be taken to include a collection of machines that individually or jointly execute the instructions 808 to perform any one or more of the methodologies discussed herein.

The machine 800 may include processors 802, memory 804, and I/O components 842, which may be configured to communicate with each other via a bus 844. In an example embodiment, the processors 802 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 806 and a processor 810 that execute the instructions 808. The term "processor" is intended to include multi-core processors that may comprise two or more independent processors (sometimes referred to as "cores") that may execute instructions contemporaneously. Although FIG. 8 shows multiple processors 802, the machine 800 may include a single processor with a single core, a single processor with multiple cores (e.g., a multi-core processor), multiple processors with a single core, multiple processors with multiples cores, or any combination thereof.

The memory 804 includes a main memory 812, a static memory 814, and a storage unit 816, both accessible to the processors 802 via the bus 844. The main memory 804, the static memory 814, and storage unit 816 store the instructions 808 embodying any one or more of the methodologies or functions described herein. The instructions 808 may also reside, completely or partially, within the main memory 812, within the static memory 814, within machine-readable medium 818 within the storage unit 816, within at least one of the processors 802 (e.g., within the processor's cache memory), or any suitable combination thereof, during execution thereof by the machine 800.

The I/O components 842 may include a wide variety of components to receive input, provide output, produce output, transmit information, exchange information, capture measurements, and so on. The specific I/O components 842 that are included in a particular machine will depend on the type of machine. For example, portable machines such as mobile phones may include a touch input device or other such input mechanisms, while a headless server machine will likely not include such a touch input device. It will be appreciated that the I/O components 842 may include many other components that are not shown in FIG. 8. In various example embodiments, the I/O components 842 may include output components 828 and input components 830. The output components 828 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 830 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 842 may include biometric components 832, motion components 834, environmental components 836, or position components 838, among a wide array of other components. For example, the biometric components 832 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 include acceleration sensor components (e.g., accelerometer), gravitation sensor components, rotation sensor components (e.g., gyroscope), and so forth. The environmental components 836 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 842 further include communication components 840 operable to couple the machine 800 to a network 820 or devices 822 via a coupling 824 and a coupling 826, respectively. For example, the communication components 840 may include a network interface component or another suitable device to interface with the network 820. In further examples, the communication components 840 may include wired communication components, wireless communication components, cellular communication components, Near Field Communication (NEC) components, Bluetooth® components (e.g., Bluetooth® Low Energy), components, and other communication components to provide communication via other modalities. The devices 822 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geolocation, location via Wi-Fi® signal triangulation, location via detecting an NFC beacon signal that may indicate a particular location, and so forth.

The various memories (e.g., memory 804, main memory 812, static memory 814, and/or memory of the processors 802) and/or storage unit 816 may store one or more sets of instructions and data structures (e.g., software) embodying or used by any one or more of the methodologies or functions described herein. These instructions (e.g., the instructions 808), when executed by processors 802, cause various operations to implement the disclosed embodiments.

The instructions 808 may be transmitted or received over the network 820, using a transmission medium, via a network interface device (e.g., a network interface component included in the communication components 840) and using any one of a number of well-known transfer protocols (e.g., hypertext transfer protocol (HTTP)). Similarly, the instructions 808 may be transmitted or received using a transmission medium via the coupling 826 (e.g., a peer-to-peer coupling) to the devices 822.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore; is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: accessing; at a server, email data for a user account; determining email activities from the email data, the email activities comprising a rate of number of read emails and sent emails from the user account over a first time frame; determining weekday email activities and weekend email activities from the email activities over the first time frame; comparing weekday email activities of a second time frame with the weekend email activities of the first time frame; and assigning an out of office label to one or more weekday of the second time frame in the calendar application for the user account based on the comparing.

Example 2 is the computer-implemented method of example 1, wherein the rate of number of emails includes a rate of read emails at the user account per hour or sent emails from the user account per hour.

Example 3 is the computer-implemented method of example 1, wherein determining weekday email activities further comprises: determining a weekday rate of number of read emails and sent emails for the user account per hour for each weekday within the first time frame; and determining a weekend rate of number of read emails and sent emails for the user account per hour for each weekend within the first time frame.

Example 4 is the computer-implemented method of example 1, further comprising: computing a weekend threshold based on the weekend email activities over the first time frame; determining that an email activity of a weekday of the second time frame is less than the weekend threshold;

and assigning the out of office label to the weekday in response to the determining that an email activity of the weekday of the second time frame is less than the weekend threshold.

Example 5 is the computer-implemented method of example 1, further comprising: generating an out of office automated email reply for the one or more weekdays assigned with the out of office label.

Example 6 is the computer-implemented method of example 5, further comprising: adjusting a content of the automated out of office email reply based on the comparing the weekday email activities of the second time frame with the weekend email activities of the first time frame, the content indicating updated out of office dates.

Example 7 is the computer-implemented method of example 1, wherein determining email activities further comprises: assigning a weight for emails read or sent within preset hours; aggregating the weighted emails per day; and determining the email activities for each day based on the weighted emails.

Example 8 is the computer-implemented method of example 1, wherein determining weekday and weekend activities further comprises: forming data clusters based on activity hours within the first time frame; selecting a cluster with the most number of weekend data points from the data clusters; and identifying weekdays and weekends in the cluster.

Example 9 is the computer-implemented method of example 1, further comprising: computing a mean and standard deviation of the weekday email activities from the first time frame; computing a mean and standard deviation of the weekend email activities from the first time frame; determining that an average number of email activities for a weekday is less than the average number of email activities for a weekend plus three times the standard deviation of the weekend number of email activities; and disqualified the user account from the assigning the out of office label in response to determining that an average number of email activities for a weekday is less than the average number of email activities for a weekend plus three times the standard deviation of the weekend number of email activities.

Example 10 is the computer-implemented method of example 1, further comprising: determining that the email activities exceed a minimum weekend email activity threshold and is within a maximum weekend email activity threshold for the time frame; and identifying weekday email activities and weekend email activities in response to determining that the email activities exceed a minimum weekend email activity threshold and is within a maximum weekend email activity threshold for the time frame.

What is claimed is:

1. A computer-implemented method comprising:
   accessing, at a server, email data for a user account;
   determining email activities from the email data, the email activities comprising a rate of number of read emails and sent emails from the user account over a first time frame;
   determining weekday email activities and weekend email activities from the email activities over the first time frame;
   comparing weekday email activities of a second time frame with the weekend email activities of the first time frame; and
   assigning an out of office label to one or more weekday of the second time frame in the calendar application for the user account based on the comparing.

2. The computer-implemented method of claim 1, wherein the rate of number of emails includes a rate of read emails at the user account per hour or sent emails from the user account per hour.

3. The computer-implemented method of claim 1, wherein determining weekday email activities further comprises:
   determining a weekday rate of number of read emails and sent emails for the user account per hour for each weekday within the first time frame; and
   determining a weekend rate of number of read emails and sent emails for the user account per hour for each weekend within the first time frame.

4. The computer-implemented method of claim 1, further comprising:
   computing a weekend threshold based on the weekend email activities over the first time frame;
   determining that an email activity of a weekday of the second time frame is less than the weekend threshold; and
   assigning the out of office label to the weekday in response to the determining that an email activity of the weekday of the second time frame is less than the weekend threshold.

5. The computer-implemented method of claim 1, further comprising:
   generating an out of office automated email reply for the one or more weekdays assigned with the out of office label.

6. The computer-implemented method of claim 5, further comprising:
   adjusting a content of the automated out of office email reply based on the comparing the weekday email activities of the second time frame with the weekend email activities of the first time frame, the content indicating updated out of office dates.

7. The computer-implemented method of claim 1, wherein determining email activities further comprises:
   assigning a weight for emails read or sent within preset hours;
   aggregating the weighted emails per day; and
   determining the email activities for each day based on the weighted emails.

8. The computer-implemented method of claim 1, wherein determining weekday and weekend activities further comprises:
   forming data clusters based on activity hours within the first time frame;
   selecting a cluster with the most number of weekend data points from the data clusters; and
   identifying weekdays and weekends in the cluster.

9. The computer-implemented method of claim 1, further comprising:
   computing a mean and standard deviation of the weekday email activities from the first time frame;
   computing a mean and standard deviation of the weekend email activities from the first time frame;
   determining that an average number of email activities for a weekday is less than the average number of email activities for a weekend plus three times the standard deviation of the weekend number of email activities; and
   disqualified the user account from the assigning the out of office label in response to determining that an average number of email activities for a weekday is less than the average number of email activities for a weekend plus three times the standard deviation of the weekend number of email activities.

10. The computer-implemented method of claim 1, further comprising:
   determining that the email activities exceed a minimum weekend email activity threshold and is within a maximum weekend email activity threshold for the time frame; and
   identifying weekday email activities and weekend email activities in response to determining that the email activities exceed a minimum weekend email activity threshold and is within a maximum weekend email activity threshold for the time frame.

11. A computing apparatus, the computing apparatus comprising:
   a processor; and
   a memory storing instructions that, when executed by the processor, configure the apparatus to:
      access, at a server, email data for a user account;
      determine email activities from the email data, the email activities comprising a rate of number of read emails and sent emails from the user account over a first time frame;
      determine weekday email activities and weekend email activities from the email activities over the first time frame;
      compare weekday email activities of a second time frame with the weekend email activities of the first time frame; and
      assign an out of office label to one or more weekday of the second time frame in the calendar application for the user account based on the comparing.

12. The computing apparatus of claim 11, wherein the rate of number of emails includes a rate of read emails at the user account per hour or sent emails from the user account per hour.

13. The computing apparatus of claim 11, wherein determining weekday email activities further comprises:
   determine a weekday rate of number of read emails and sent emails for the user account per hour for each weekday within the first time frame; and
   determine a weekend rate of number of read emails and sent emails for the user account per hour for each weekend within the first time frame.

14. The computing apparatus of claim 11, wherein the instructions further configure the apparatus to:
   compute a weekend threshold based on the weekend email activities over the first time frame;
   determine that an email activity of a weekday of the second time frame is less than the weekend threshold; and
   assign the out of office label to the weekday in response to the determining that an email activity of the weekday of the second time frame is less than the weekend threshold.

15. The computing apparatus of claim 11, wherein the instructions further configure the apparatus to:
   generate an out of office automated email reply for the one or more weekdays assigned with the out of office label.

16. The computing apparatus of claim 15, wherein the instructions further configure the apparatus to:
   adjust a content of the automated out of office email reply based on the comparing the weekday email activities of the second time frame with the weekend email activities of the first time frame, the content indicating updated out of office dates.

17. The computing apparatus of claim 11, wherein determining email activities further comprises:
   assign a weight for emails read or sent within preset hours;
   aggregate the weighted emails per day; and
   determine the email activities for each day based on the weighted emails.

18. The computing apparatus of claim 11, wherein determining weekday and weekend activities further comprises:
   form data clusters based on activity hours within the first time frame;
   select a cluster with the most number of weekend data points from the data clusters; and
   identify weekdays and weekends in the cluster.

19. The computing apparatus of claim 11, wherein the instructions further configure the apparatus to:
   compute a mean and standard deviation of the weekday email activities from the first time frame;
   compute a mean and standard deviation of the weekend email activities from the first time frame;
   determine that an average number of email activities for a weekday is less than the average number of email activities for a weekend plus three times the standard deviation of the weekend number of email activities; and
   disqualified the user account from the assigning the out of office label in response to determining that an average number of email activities for a weekday is less than the average number of email activities for a weekend plus three times the standard deviation of the weekend number of email activities.

20. A non-transitory computer-readable storage medium, the computer-readable storage medium including instructions that when executed by a computer, cause the computer to:
   access, at a server, email data for a user account;
   determine email activities from the email data, the email activities comprising a rate of number of read emails and sent emails from the user account over a first time frame;
   determine weekday email activities and weekend email activities from the email activities over the first time frame;
   compare weekday email activities of a second time frame with the weekend email activities of the first time frame; and
   assign an out of office label to one or more weekday of the second time frame in the calendar application for the user account based on the comparing.

* * * * *